United States Patent
Kluge

(10) Patent No.: US 6,524,359 B1
(45) Date of Patent: Feb. 25, 2003

(54) FILTER BAG FOR A POCKET AIR FILTER AND METHOD FOR THE PRODUCTION THEREOF

(76) Inventor: Klaus Kluge, Pittlerstr. 66. D-63225, Langen (DE)

( * ) Notice: Subject to any disclaimer, the term of this patent is extended or adjusted under 35 U.S.C. 154(b) by 0 days.

(21) Appl. No.: 09/600,908
(22) PCT Filed: Dec. 23, 1998
(86) PCT No.: PCT/EP98/08422
§ 371 (c)(1), (2), (4) Date: Aug. 30, 2000
(87) PCT Pub. No.: WO99/37385
PCT Pub. Date: Jul. 29, 1999

(30) Foreign Application Priority Data

Jan. 22, 1998 (DE) ..................... 298 00 969 U

(51) Int. Cl.[7] ............................... B01D 46/02
(52) U.S. Cl. ............................. 55/378; 55/381; 55/382; 55/341.7; 55/529; 55/DIG. 5; 55/DIG. 12; 156/204; 156/227; 156/474
(58) Field of Search .................. 55/378, 381, 382, 55/341.7, 529, DIG. 5, DIG. 12; 156/204, 227, 474

(56) References Cited

U.S. PATENT DOCUMENTS

| | | | |
|---|---|---|---|
| 3,247,813 A | | 4/1966 | Hart et al. |
| 4,056,375 A | | 11/1977 | Ringel et al. |
| 4,080,185 A | * | 3/1978 | Richter et al. ............... 55/379 |
| 4,261,713 A | | 4/1981 | Bourdois et al. |
| 4,799,944 A | * | 1/1989 | Dixon et al. ................. 55/529 |
| 5,554,203 A | * | 9/1996 | Borkent et al. ............... 55/378 |
| 5,695,535 A | * | 12/1997 | Hintenlang et al. ........... 55/379 |
| 5,928,396 A | * | 7/1999 | Choi ........................... 55/379 |
| 6,010,548 A | * | 1/2000 | Burkhead et al. ............. 55/378 |
| 6,258,142 B1 | * | 7/2001 | Holt et al. .................... 55/378 |

FOREIGN PATENT DOCUMENTS

| | | |
|---|---|---|
| DE | 24 11 697 | 1/1975 |
| DE | 36 15 484 | 11/1987 |
| DE | 94 09 639.2 | 9/1994 |
| EP | 0 082 106 | 12/1982 |
| EP | 0 666 096 | 11/1994 |

* cited by examiner

Primary Examiner—David A. Simmons
Assistant Examiner—Minh-Chau T. Pham
(74) Attorney, Agent, or Firm—Burns, Doane, Swecker & Mathis, LLP

(57) ABSTRACT

A filter bag for a pocket air filter includes two side walls. Both lateral edges of the side walls, and the edge of the base are welded to each other. The side walls are made of an air-permeable filter material which can be ultrasonically welded, and at least part of the surface of said side walls is joined by means of interconnected welded spacer elements running substantially parallel to said side walls. The spacer elements are formed by an intermediate layer made from a strip of flexible material, which is alternately welded to the side walls in zig-zag fashion.

10 Claims, 4 Drawing Sheets

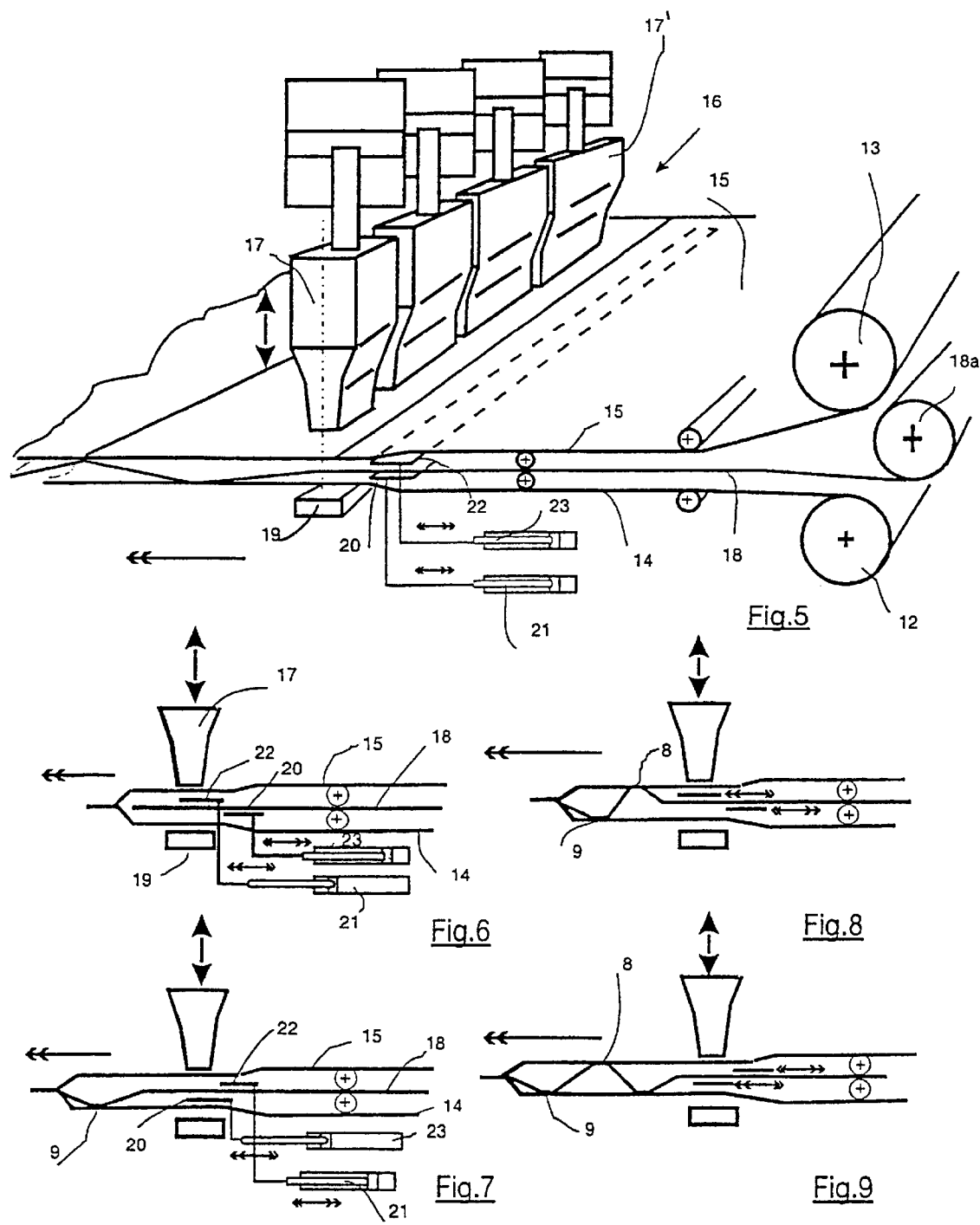

FILTER BAG FOR A POCKET AIR FILTER AND METHOD FOR THE PRODUCTION THEREOF

BACKGROUND OF THE INVENTION

The invention relates to a filter bag for pocket air filters (air filters having pockets), comprising two side walls whereby both lateral edges of said side walls and the edge of the base are welded to each other. Said side walls are made of an air-permeable filter material, which may be ultrasonically welded, and whereby at least part of the surface of said side walls is joined by means of interconnected welded spacer elements running substantially parallel to said side walls.

Filter bags of this type are usually arranged next to each other with a space in between to form a pocket air filter. The best possible even (air) flow in all areas of the filter layer is the goal to keep the rate of flow at a minimum and to obtain optimum utilization of the filter layer. Thus it is necessary in pocket air filters to keep the side walls of each single filter bag at an optimum distance from one another since only in this way optimum spacing between the neighboring filter bags can be maintained.

In case of filter bags that are preferably made from non-weldable filter material, this spacing is achieved by spacer seams, which have to be subsequently sealed with hot-melt adhesive. This sewing process, which can also be used for weldable filter materials, has however the disadvantage that the necessary sealing of the needle holes is performed partly incomplete. Besides, the perforation of the filter material.

To achieve dependable sealing of the filter bag and to prevent tearing, there is known from the type of filter bag mentioned in the beginning to weld the two filter side surfaces to the spacer elements, which are made of tubes consisting of flexible material and which then form the two side walls. The therefor necessary effort in labor is relatively high and costly in comparison to the sewing process, especially since the spacer elements made of tubes have double walls.

It is therefore the object of the invention to provide a filter bag of the type mentioned in the beginning that is of simple design and can be manufactured with low expenditure of labor and material. Thereby an optimum configuration of the filter bag in its operational state is to be guaranteed to maintain its optimum spacing between the two side walls.

This object is achieved according to the invention in that the spacer elements are formed by an intermediate layer made from a strip of flexible material that is alternately welded to one of the side walls.

With this alternate welding to one of the side walls, it is achieved that the intermediate layer takes on a fan-shaped (zigzag-shaped) design. Thereby the side walls are dependably maintained at the preset optimum spacing from one another whereby the respective diagonal direction of the spacer elements formed by said fan-shaped intermediate layer result in a very effective stabilization of the two side walls against relative displacement. Thus it is made possible to considerably increase the number of individual juxtaposed filter bags within the preset grid width of pocket air filters (currently a maximum of 12 filter bags at a with of 592 mm). This gives the advantage of increased dust collection capability and longer durability.

The production of the filter bag is considerably simplified since instead of single tube-shaped spacer elements, which have to be individually installed and welded, there is now only one interconnected intermediate layer installed, which is alternately joined to one or the other side wall by ultrasonic welding. The filter bag can therefore be manufactured very easily and cost-effectively; it is of simple design and has an optimum configuration of filter surfaces, which are maintained at an optimum spacing to one another so that a free (air) flow is guaranteed for a plurality of parallel aligned filter bags, which are arranged next to one another as close as possible.

The intermediate layer is preferably joined alternately with the one or the other side wall by welding seams created through ultrasonic welding whereby said welding seams run substantially parallel to the lateral edges.

According to one of the preferred embodiments of the invention it is proposed that the intermediate layer consists of a single strip of material and is welded to the two lateral edges of both side walls. Thereby the intermediate layer runs continuously from one lateral edge to the other lateral edge of the filter bag. This contributes to the stabilization of the filter bag and simplifies production.

The neighboring welding seams of the intermediate layer are preferably arranged at equal distance to one another. Thereby the same design is provided substantially across the entire width of the filter bag.

According to a preferred embodiment of the filter bag it is proposed that the intermediate layer is disposed at a distance from the base, and that the two side walls in the area between the base and the intermediate layer are joined directly with one another by welding seams that are running substantially parallel to the lateral edges. Thereby the filter bag is tapered from its in-flow opening toward the base so that a general even (air) flow is ensured through the entire length of the filter bag.

The invention relates additionally to an advantageous method for the production of filter bags of this type. Starting from a known method whereby two layers of filter material are welded together by ultrasound at both lateral edges and at the base whereby spacing elements, which are arranged in between, are also welded thereto by ultrasound; the method according to the invention is characterized in that two continuous inserted strips of filter material are welded at alternately superposed welding seams, which run transversely to the longitudinal direction of the strip, to a continuous intermediate layer strip inserted in between, whereby ultrasonic welding occurs through both strips of filter material and through the intermediate layer strip, and whereby during consecutively performed welding processes a non-weldable separating plate is inserted alternately between the intermediate layer strip and the one or the other strip of material, respectively.

A continuous manufacturing process has been made possible hereby for the first time, which may be carried out very rapidly and simply and which is therefore cost-effective. Instead of the complicated and labor-intensive insertion of separating plates by hand, there are now separating plates, which are arranged between each of the intermediate layers and each of the strip of filter material, and which are pushed into the welding area according to demand whenever the welding of superposed layers is to be prevented at a particular place. In this way it is very simple, in view of production engineering, to weld the intermediate layer strip alternately to one or the other strip material while forming a side wall.

According to a preferred embodiment of the invention it is proposed that the two separating plates are designed as separating straps, which run cross-wise to the longitudinal strip direction and which are alternately moved in and out of the welding area in the direction of the moving strip. The separating straps move in very short strokes so that a relatively rapid operating process is guaranteed.

During welding of the lateral edges, the two separating plates or separating straps remain in a retracted position relative to the welding area so that the side walls may be welded to the intermediate layer at the lateral edges.

The two strips of filter material and the intermediate layer strip may be fed into a welding station by controlled forward-feed steps wherein there is at least one ultrasonic welding head, which extends across the longitudinal strip direction and which is disposed at the opposite side of a welding counter-surface. Thereby one single welding station is sufficient to perform all transverse welding on a filter bag, one after the other, in the operating area of the ultrasonic welding heads (sonotrodes).

Preferably there are a plurality of welding heads at the welding station which are arranged side by side and transverse to the strip direction, and which may be controlled individually. Thus it is possible to make welding seams of various lengths and especially perform direct welding of the two side walls in the area near the base of the filter bag.

BRIEF DESCRIPTION OF THE DRAWINGS

Embodiment examples of the invention are described in more detail below with reference to the accompanying drawings.

FIG. 5 shows in a simplified schematic spatial illustration a device for the production of filter bags of FIG. 1.

FIGS. 6–9 shows in a schematic illustration consecutive processing steps in the production of filter bags on a device of FIG. 5.

DETAILED DESCRIPTION OF A PREFERRED EMBODIMENT OF THE INVENTION

Figure 1:
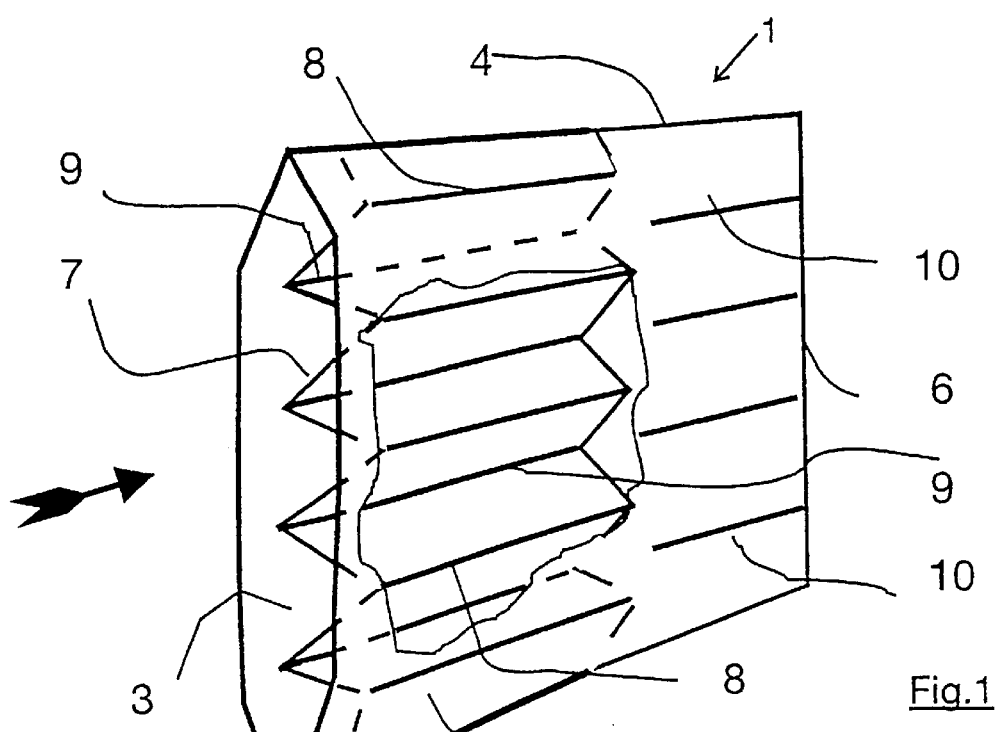
FIG. 1 shows a schematic spatial illustration of a filter bag for a pocket air filter in a partly exploded view.
Figure 3:
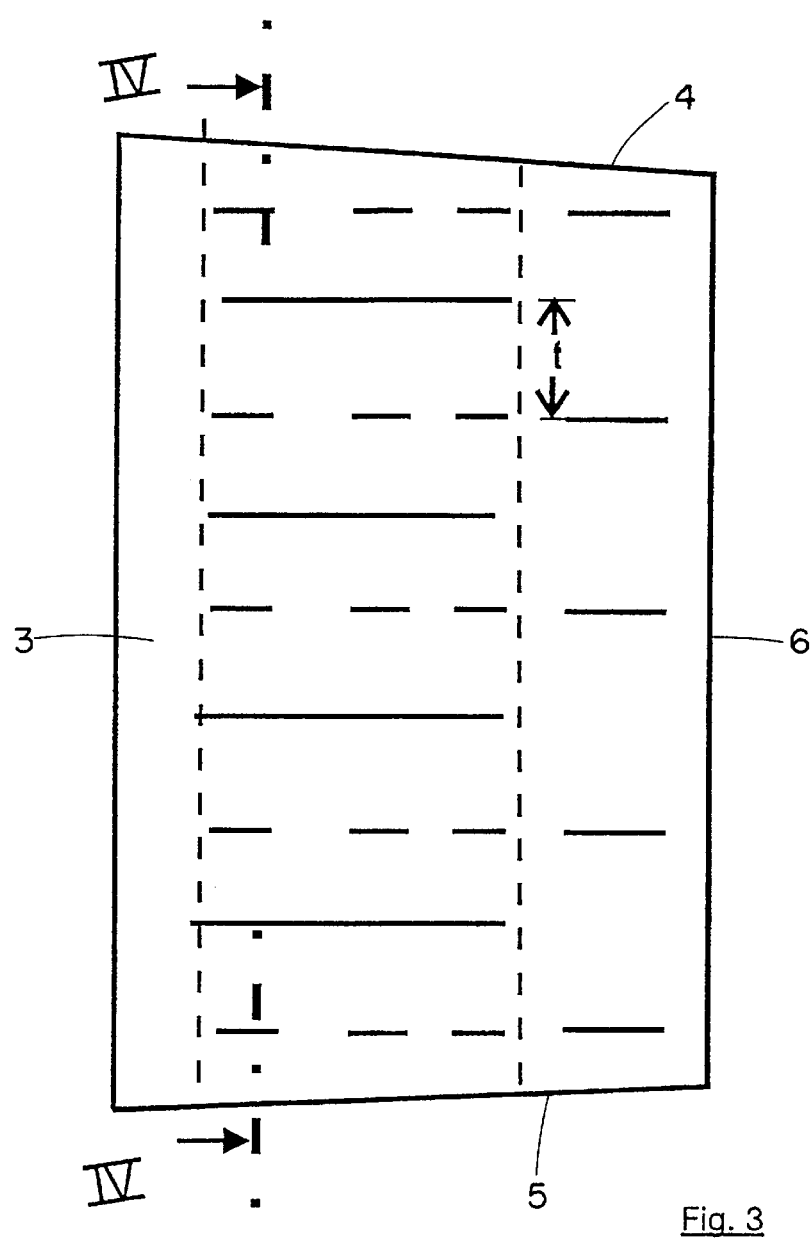
FIG. 3 shows a top view of a filter bag of FIG. 1.
Figure 4:
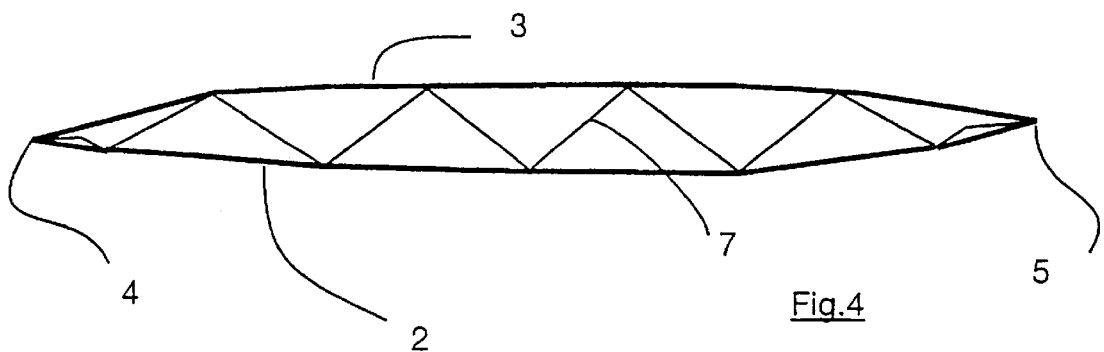
FIG. 4 shows a section along line IV—IV through the filter bag of FIG. 3 in an operating condition.
Figure 10:
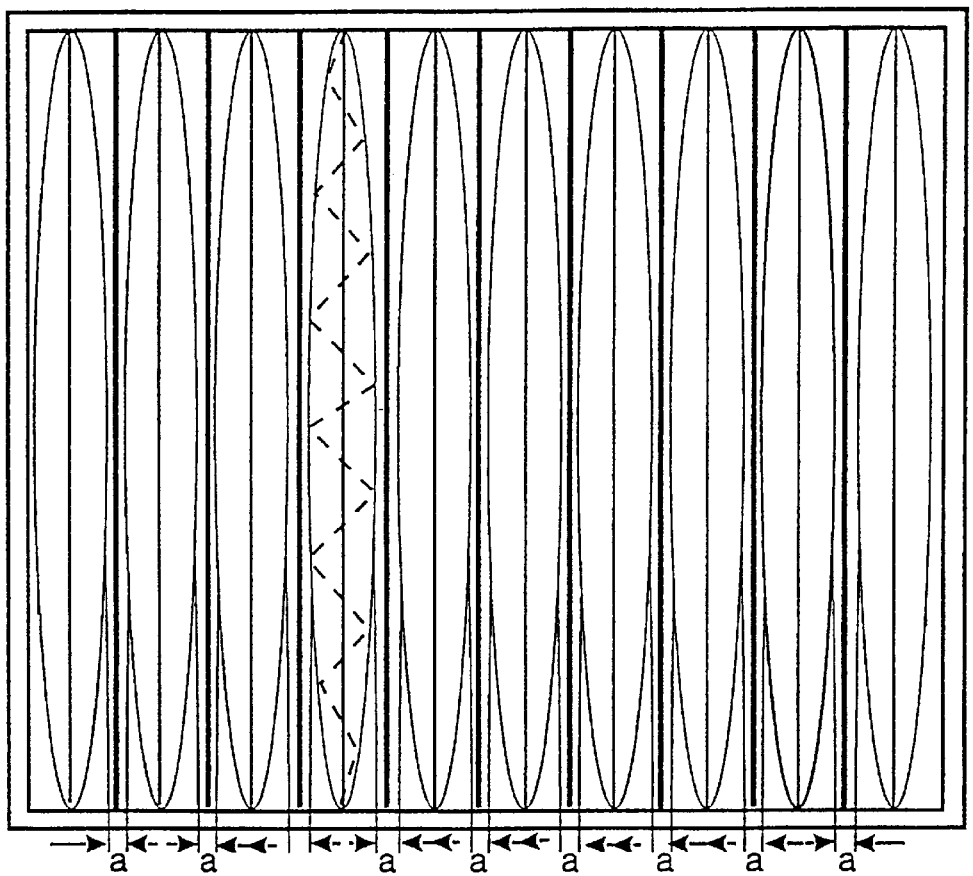
FIG. 10 shows a rear view of the pocket air filter of FIG. 2.
Figure 11:
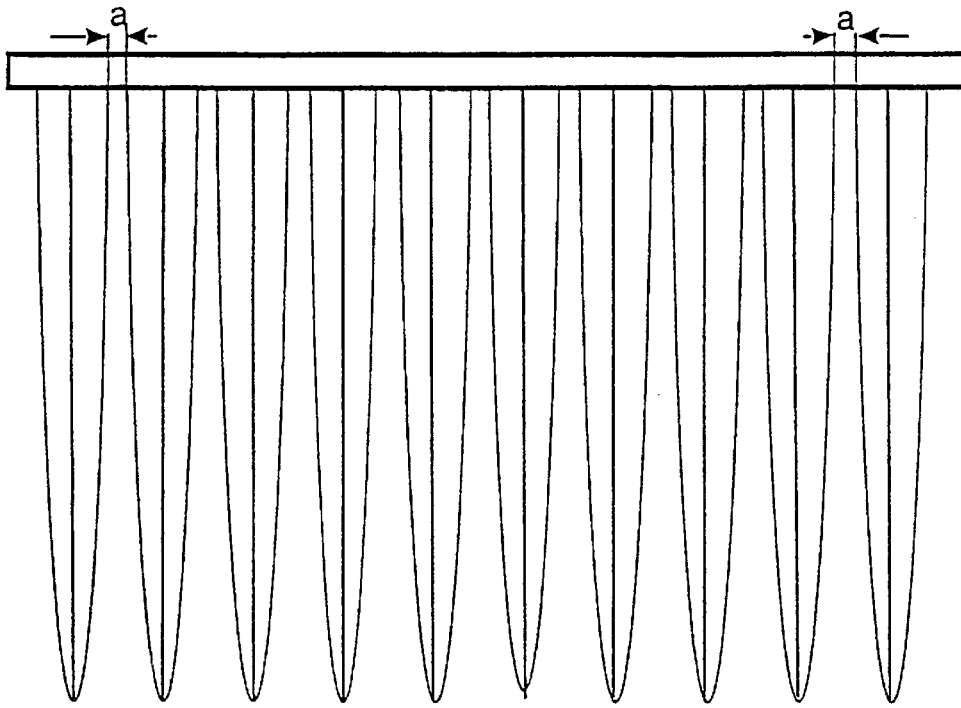
FIG. 11 shows a top view of the pocket filter of FIG. 10.

The filter bag 1 illustrated in FIGS. 1, 3 and 4 is provided with two side walls 2, 3 made of air-permeable filter material, which may be ultrasonically welded together. The two side walls 2, 3 are joined by ultrasonic welding at their two lateral edges 4, 5 and the base 6.

An intermediate layer 7 consisting of a flexible strip of material is arranged fan-shaped in the cross section of the filter bag 1 between the two side walls 2, 3 and joined with said side walls to form spacer elements. The intermediate layer 7 is alternately joined at the ultrasonic welding seams 8 and 9 with the side walls 2 or the side walls 3. The welding seams 8, 9 run. substantially parallel to the lateral edges 4, 5.

As one can see in FIG. 4, the intermediate layer 7 consists of a single strip of material, which is welded together with the two lateral edges 4 and 5 of the interconnected side walls 2 and 3. As shown in the illustrated embodiment example in FIG. 3, the neighboring welding seams 8 or 9 of the intermediate layer 7 are arranged at an equal distance t to one another.

As one can see in FIGS. 1 and 3, the intermediate layer 7 is disposed at a distance from the base 6. In the area between the base 6 and the intermediate layer 7 the two side walls 2, 3 are directly joined with one another by welding seams 10. These welding seams 10 also run substantially parallel to the lateral edges 4 and 5.

Figure 2:
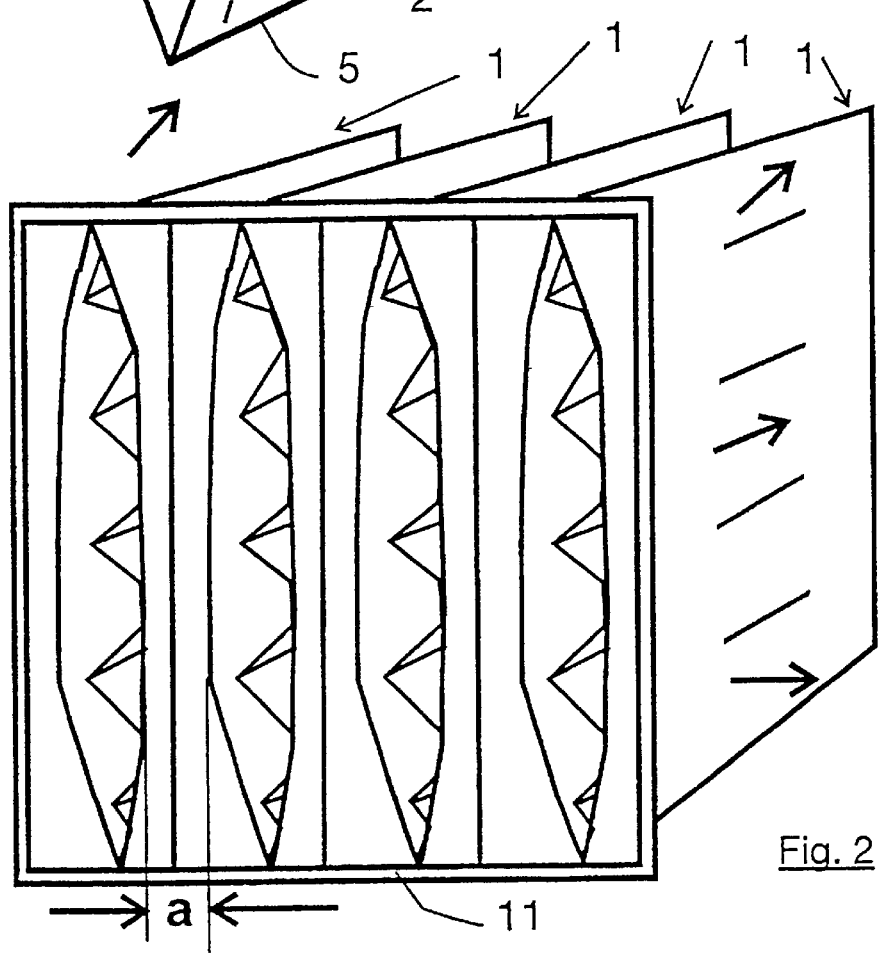
FIG. 2 shows a pocket air filter consisting of a plurality of filter bags of FIG. 1.

As it is shown in FIG. 2, there are several bags 1, in the illustrated embodiment example there are four filter bags 1, contained in a frame 11 to form a pocket air filter. The spacer elements formed by the intermediate layer 7 in the individual filter bag 1 keep thereby the two side walls 2, 3 in an operating condition, which means that during the flow-through of air, a preset distance from one another is maintained. Thereby a preset equal distance a is maintained between neighboring filter bags 1 in the pocket air filter, whereby an even and unobstructed air stream is guaranteed.

The method for the production of the filter bag 1 is described below with reference to the accompanying FIGS. 5–9.

A continuous strip 14 or 15 of filter material is pulled off rolls 12 and 13 (FIG. 5) and is fed into a welding station 16. At the same time, a continuous intermediate layer strip 18 is pulled off a roll 18a and is fed between the two strips 14 and 15 and is fed also to the welding station 16.

At the welding station 16 there are a plurality of welding heads 17, designed as ultrasonic tools (sonotrodes), which are arranged in the transverse direction of the strip, side by side, and on top of the upper strip 15. Each of the welding heads 17 is controllable individually. A welding counter-surface 19 is arranged on the opposite side of the welding heads 17 and underneath the lower strip 14. During the welding process, the material to be welded is pressed against the welding counter-surface 19 and an ultrasonic force (effect) is exerted onto the material to be welded.

A first separating strap 20 is disposed between the intermediate layer 18 and the lower strip 14 directly in front of the feed element into the welding station 16. The separating strap 20 is connected at one end to a pressure-medium activated, double-action, forward-feed cylinder 21 (indicated in FIG. 5 only schematically).

In a corresponding manner, there is a second separating strap 22 disposed between the intermediate layer 18 and the upper strip 15 directly in front of the welding station 16. Said second separating strap 22 is also connected at its end to a double-action, forward-feed cylinder 23 (indicated in FIG. 5 only schematically).

Both separating straps 20, 22 may be inserted selectively via control of their feed cylinder 21 or 23 into the welding area between the welding heads 17 and the welding counter-surface 19 of the welding station and said separating straps may be again retracted in the opposite direction. The separating straps 20 and 22 consist of a material (e.g. PTFE) which prevents the welding of the strip 14 to the intermediate layer strip 18, depending on the degree of insertion. The separating strips 20, 22 are not weldable with the intermediate layer strip 18 and the strip 14, 15 and have to be sized in such a manner that the ultrasonic effect necessary for welding is transferred through the separating strips 20, 22.

Whenever the welding heads 17 are actuated in the position shown in FIG. 5, whereby both separating straps 20, 22 are disposed outside the welding station 16, then all three layers 14, 15 and 18 are welded together on the lateral edge 4 to form a (solid) weld. Subsequently, the strips 14, 15 and 18 are moved forward after opening of the welding station 16 whereby they are moved together by a distance t (FIG. 3) corresponding to the controlled forward-feed step and to the left in FIG. 5. At the same time, the upper separating strap 22 is pushed forward via the control of the forward-feed cylinder 23 into the area between the welding heads 17 and the welding counter-surface 19, as shown in FIG. 6.

In this state of the welding process, the intermediate layer strip 18 is welded only to the lower strip 14 of the filter material, while the separating strap 22 prevents welding of the intermediate strip 18 to the upper strip 15 of the filter material. At this point there is thus a welding seam 9 created, as described according to FIG. 1.

After a new forward-feed step of the strips 14, 15 and 18 by a distance t, the first separating strap 20 is pushed forward before the next welding step via control of its forward-feed cylinder 21 into the welding area, while the second separating strap 22 is simultaneously retracted in the opposite direction. In the subsequent welding step (FIG. 7), welding is performed only of the intermediate layer strip 18 to the upper strip 15; thus a welding seam 8 is created.

FIG. 8 and FIG. 9 show subsequent processing steps, whereby the position shown in FIG. 8 corresponds to the position in FIG. 6, and the position shown in FIG. 9 corresponds to the position in FIG. 7.

After several welding cycles, at which the welding seams 8 and 9 are created alternately, all three strips 14, 15 and 18 are finally welded together to form the welded, lateral edges 5. The filter bags made in this manner may be separated from each other along the welding seams of the lateral edges 4 and 5.

Any welding on the base 6 may be performed in a continuous manner only with a roller-weld station (not shown) during the forward-feed of the strips 14, 15 and 18.

However, in the example shown in FIG. 5, the welding head 17' at the very rear lies outside the area of the intermediate layer strip 18. By controlling said welding head 17', the welding seams 10 in the area near the base 6 may be created simultaneously with the welding seams 9. The position of the welding seams 10 may be selected basically independent from the position of the welding seams 8 and 9.

In a corresponding manner, and by the control of the preset positioning distances, the separating straps 20, 22 and the welding heads 17 or 17', any desired configuration of a filter bag may be welded together containing a fan-shaped intermediate strip 7. Several intermediate layers arranged side by side are also weldable according to this principle, whereby spacers of varying sizes could be created between the side walls 2, 3 wherein the number of welding seams would be selected differently for each intermediate layer. The filter bag geometry can be optimized through the number and arrangement of flame washing (sweating) of corresponding welding seams 10 without inserting an intermediate layer, which leads to an optimum reduction of (air) flow resistance in its operating condition.

What is claimed is:

1. A filter bag comprising first and second side walls formed of air-permeable filter material, the first side wall including two lateral edges welded to respective lateral edges of the second side wall, and a base edge welded to a base edge of the second side wall; the first and second side walls including respective first and second inside surfaces facing one another; and a spacer disposed between the first and second side walls for separating the first and second side walls, the spacer defined by a single strip of flexible material which constitutes a separate strip with respect to the first and second side walls, the strip extending from one welded pair of lateral edges to the other welded pair of lateral edges while welded alternately to the inside surfaces of the first and second side walls, wherein the spacer is welded at a plurality of locations to each of the first and second side walls.

2. The filter bag according to claim 1 wherein the strip is welded to the inside surfaces of the first and second side walls by ultrasonic weld seams extending parallel to the lateral edges.

3. The filter bag according to claim 1 wherein the strip is welded to the lateral edges of the first and second side walls.

4. The filter bag according to claim 2 wherein the weld seams of the strip are equidistantly spaced apart.

5. The filter bag according to claim 1 wherein an edge of the strip disclosed closest to the welded pair of base edges is spaced from the welded pair of base edges, wherein portions of the first and second side walls situated between the strip edge and the welded pair of base edges being welded together by weld seams extending parallel to the lateral edges.

6. A method of producing filter bags comprising the steps of:
A) arranging first and second continuous outer strips in superimposed relationship, with a continuous intermediate strip disposed therebetween, the first and second outer strips including respective first and second inside surfaces facing one another, the intermediate strip constituting a separate strip with respect to the first and second outer strips;
B) applying an ultrasonic welding device to one of the first and second outer strips at spaced weld locations therealong; and
C) introducing, at each of the weld locations, a non-weldable separating plate, whereby the plate is introduced between the intermediate strip and alternating ones of the first and second outer strips at successive ones of the weld locations to cause the intermediate strip to be welded alternatively to the first and second inside surfaces of the first and second outer strips along a weld seam extending perpendicularly to the longitudinal direction separating the weld locations, wherein the plate is welded at a plurality of locations to each of the first and second inside surfaces.

7. The method according to claim 6 wherein there are two of the separating plates, one of the separating plates being moved in a first direction away from a position between the intermediate strip and one of the outer strips at one of the weld locations to enable the intermediate strip to be welded to the one outer strip, while the other separating plate is being moved opposite the first direction in a second direction to a position between the intermediate strip and the other outer strip at that weld location, to prevent the intermediate strip from being welded to the other outer strip.

8. The method according to claim 7 further including the step of periodically moving both of the separating plates in the first direction to enable the welding device to weld the intermediate strip to both of the first and second outer strips.

9. The method according to claim 6 further including the step of intermittently advancing the first and second outer strips and the intermediate strip relative to the welding device in the longitudinal direction to cause the weld locations to be brought successively to the weld device, the weld device performing a welding operation while pressing against both outer strips and the intermediate strip against a welding counter-surface located behind the second outer strip.

10. The method according to claim 9 wherein the weld device comprises a plurality of aligned welding heads, and comprising the step of individually actuating the weld heads.

* * * * *